(12) United States Patent
Zehring et al.

(10) Patent No.: US 12,022,807 B2
(45) Date of Patent: Jul. 2, 2024

(54) MODULAR BIRDING ACCESSORY POLE SYSTEM

(71) Applicants: Steven B. Zehring, West Lafayette, IN (US); Joseph Holscher, Fowler, IN (US); John C. Holscher, Fowler, IN (US)

(72) Inventors: Steven B. Zehring, West Lafayette, IN (US); Joseph Holscher, Fowler, IN (US); John C. Holscher, Fowler, IN (US)

(73) Assignee: Holscher Products, Inc., Fowler, IN (US)

( * ) Notice: Subject to any disclaimer, the term of this patent is extended or adjusted under 35 U.S.C. 154(b) by 341 days.

(21) Appl. No.: 17/397,255

(22) Filed: Aug. 9, 2021

(65) Prior Publication Data

US 2022/0046899 A1    Feb. 17, 2022

Related U.S. Application Data

(60) Provisional application No. 63/064,007, filed on Aug. 11, 2020.

(51) Int. Cl.
*A01K 31/12* (2006.01)
*A01K 31/14* (2006.01)
*A01K 39/01* (2006.01)

(52) U.S. Cl.
CPC .............. *A01K 31/12* (2013.01); *A01K 31/14* (2013.01); *A01K 39/01* (2013.01)

(58) Field of Classification Search
CPC ......... A01K 31/12; A01K 31/14; A01K 39/01
See application file for complete search history.

(56) References Cited

U.S. PATENT DOCUMENTS

| | | | | |
|---|---|---|---|---|
| 5,199,361 | A * | 4/1993 | Robinson | E05B 73/00 109/51 |
| 10,557,590 | B1 * | 2/2020 | Brassard | B62J 11/00 |
| 10,602,817 | B2 * | 3/2020 | Price | A45B 25/00 |
| 2009/0065662 | A1 * | 3/2009 | Taylor | A45F 3/44 248/156 |
| 2010/0175627 | A1 * | 7/2010 | Carpenter | A61L 2/16 424/618 |
| 2014/0020310 | A1 * | 1/2014 | Lee | E04H 17/009 52/157 |
| 2015/0368924 | A1 * | 12/2015 | Izradel | F21S 8/085 362/183 |
| 2017/0251792 | A1 * | 9/2017 | Brooks | A01K 5/015 |
| 2021/0324653 | A1 * | 10/2021 | Narvaez-Newman | A45B 23/00 |

* cited by examiner

*Primary Examiner* — Bradley Duckworth
(74) *Attorney, Agent, or Firm* — Maginot, Moore & Beck, LLP

(57) ABSTRACT

A pole system if provided for supporting birding accessories, such as bird feeders, perches or bird houses. The pole system includes a hollow outer tube and an elongated post extending therethrough. The post has an auger at one end and an opposite end configured to engage a tool for rotating the post. A disk is attached to a bottom end of the outer tube to engage the ground when the pole system is installed. A plurality of stakes are removably engaged to the disk to project radially outward from the outer tube. The stakes include a downturned end for driving into the ground after the auger has been threaded into the ground.

17 Claims, 7 Drawing Sheets

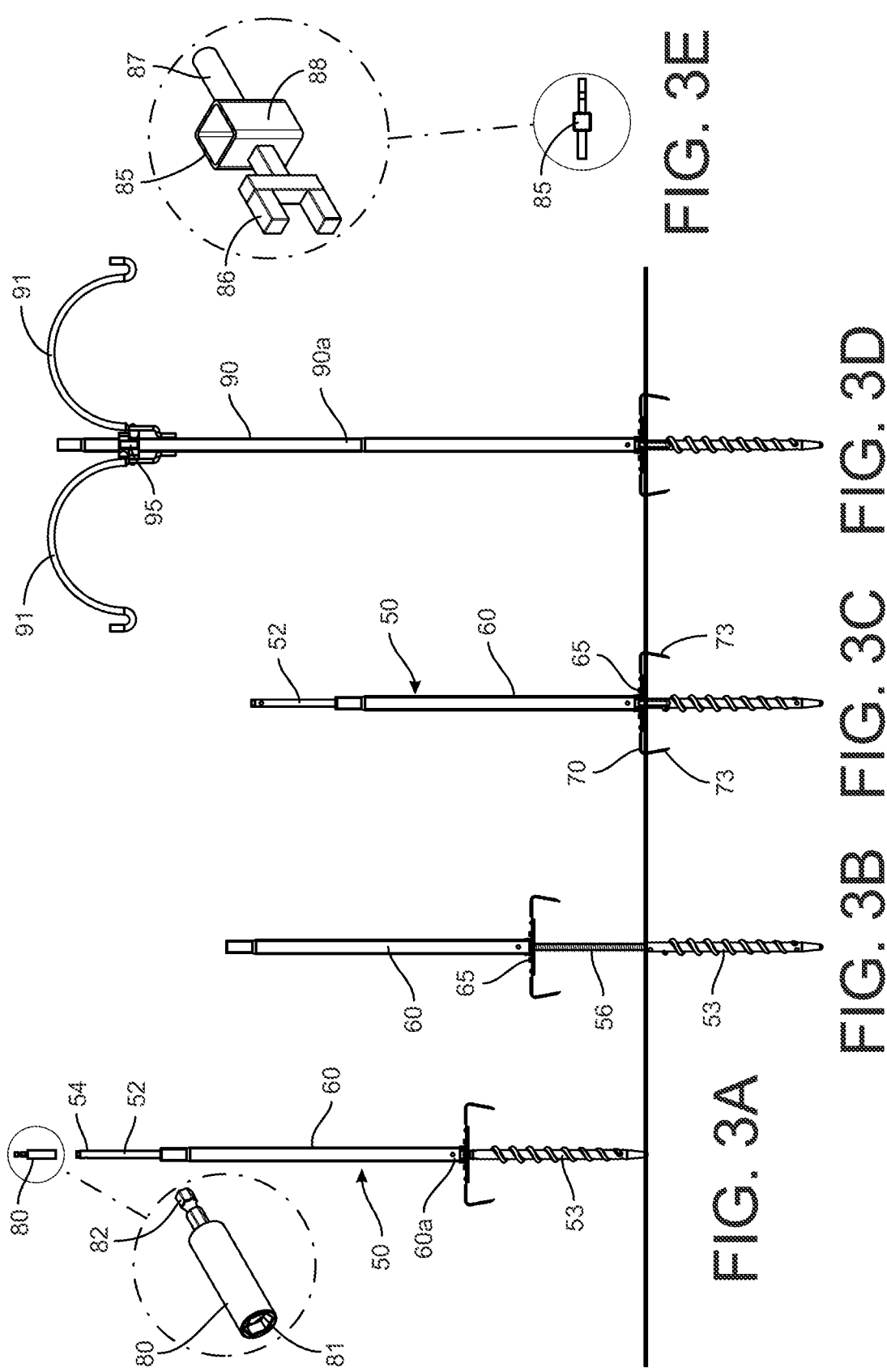

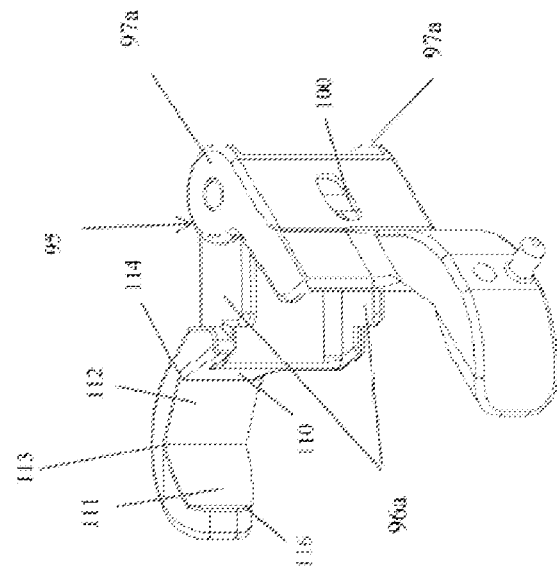
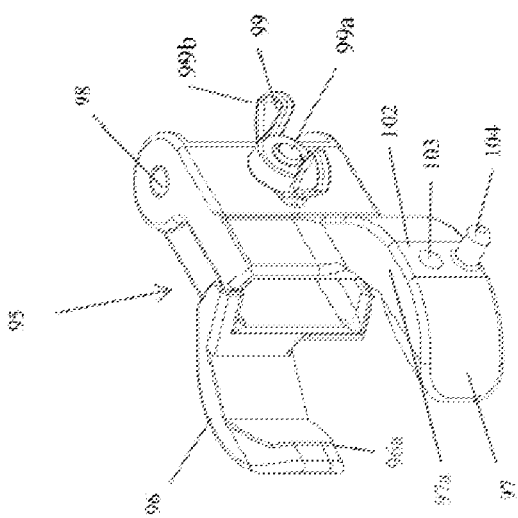
FIG. 4A
FIG. 4B

MODULAR BIRDING ACCESSORY POLE SYSTEM

PRIORITY CLAIM

This application is a utility filing from and claims priority to U.S. Provisional Application No. 63/064,007, filed on Aug. 11, 2020, the entire disclosure of which is incorporated herein by reference.

BACKGROUND

The present disclosure is for a pole system for use in supporting birding accessories, such as bird feeders, perches, houses and the like.

For quite some time, birding has been a very popular hobby. Many people find that watching birds is a pleasant, relaxing, and educational way to spend time and observe nature. Although some bird watching is performed in a nature preserve-like settings, such as at parks and forests, much bird watching also occurs in and around the homes and yards of the bird watchers. To help better attract birds to watch, many people erect various bird attracting devices such as bird houses, feeders and baths. Along with the bird houses, feeders and baths, mounting hardware must be employed in order to place the bird house or bird feeder at a desired location. This mounting hardware can be as simple as a rope or wire that ties the bird attracting device to the branch of a tree, or a plurality of nails that nail a bird house, feeder or bath to a tree or a wall.

In addition to this rudimentary hardware, more elaborate hardware exists such as mounting brackets and poles onto which a bird attracting device may be hung. One example of a popular mounting pole is shown and described in U.S. Pat. No. 6,386,142, which issued on May 14, 2002, the entire description of which is incorporated herein by reference. In general terms, the mounting pole assembly 10 includes a pole 12 that includes an auger end 14 configured for threading into the ground, as shown in FIG. 1. A stabilizer 15 is mounted on the pole 12 by a collar 17 and held in place by tightening a thumb screw 18 onto the pole. The stabilizer 15 includes a number of tines 16 that are pushed into the ground as the collar 17 is slid downward along the pole after the auger end 14 has been fully threaded into the ground. The assembly 10 also includes accessories 20 that are mounted at various heights along the pole 12. The assembly includes mounting collars 21 that support the accessory 20 and that are fastened to the pole by a thumbscrew 22, in the same manner as the stabilizer. Once the pole 12 and stabilizer 16 have been placed in the ground the accessories 20 can be added with the mounting collars 22. After the accessories have been added, the feeder mounting assembly 25 can be mounted on top of the pole 12 by placing the collar 26 on the end of the pole. The assembly 25 includes two or more arms 27 that extend outward to support bird feeders 28.

While the pole assembly 10 has been a commercial success, there are certain detriments inherent with the design of the assembly. One particular detriment is that the entire assembly requires a relatively sizable package for shipping the product to a retailer. More specifically, the stabilizer 15 and feeder mounting assembly 25 tend to dictate the overall circumference of the packaging since the tines 16 project outward from and are affixed to the collar 17 and by the arms 27 of the feeder mounting assembly. Another detriment is that the mounting collars 21 inherently limit the vertical location of the accessories 20, and in particular prevents multiple accessories from being placed at the same or nearly the same height along the pole. The mounting collars 21 must also be threaded onto the pole before the feeder mounting assembly 25 can be added. A further detriment is that the stabilizer 16 can be difficult to adjust after the pole assembly has been use for a while.

SUMMARY OF THE DISCLOSURE

A pole system is provided for supporting birding accessories, such as bird feeders, perches or bird houses. The pole system comprises an elongated hollow outer tube and an elongated post extending therethrough. The post includes an auger at one end configured to be driven into the ground and an opposite end configured to engage a tool for rotating the post. The elongated post has a length greater than the length of the elongated tube so that the opposite end of the post can be engaged outside the tube when the auger is driven into the ground. A threaded interface is provided between the outer tube and the inner pole for threaded engagement of the two components when the pole system is mounted on the ground.

A disk is attached to a bottom end of the outer tube, the disk defining an opening for passage of the post therethrough. The bottom surface of the disk is configured to engage and be embedded within the ground. The disk includes a plurality of flanges on an upper surface opposite the bottom surface, each of the flanges defining an opening. A plurality of stakes are provided corresponding to the plurality of flanges. The stakes include an elongated leg, one end of the leg being upturned and configured to be engaged within the opening of a corresponding one of the plurality of flanges. The opposite end of the elongated leg is downturned relative to the upturned end and is configured to penetrate the ground. The upturned leg of each of the plurality of stakes is removably received by a corresponding one of the plurality of flanges with the elongated leg extending radially outward from the disk.

A tool is provided that can be used to rotate the outer tube or the pole. The tool can include a collar for receiving another outer tube to be used as a fulcrum for rotating the pole system into the ground.

The pole system includes at least one clamp, the clamp including an upper jaw and a lower jaw pivotably connected to each other. At least one of the jaws includes a mounting feature for receiving an accessory mounted thereon. The jaws can be locked together when the clamp is clamped to the outer tube. The upper jaw is vertically offset form the lower jaw so that two clamps can be mounted on the outer tube in close proximity or contact.

DESCRIPTION OF THE DRAWINGS

FIGS. 3A-3D are side views of the mounting pole assembly of FIG. 2 shown in different stages of installation.

FIG. 3E is an enlarged view of a tool for use during installation of the mounting pole assembly.

FIGS. 4A and 4B are perspective views of a clamp for use with the pole assemblies of FIGS. 2 and 6, with the clamp shown in its closed and opened configurations.

DETAILED DESCRIPTION

Figure 1:
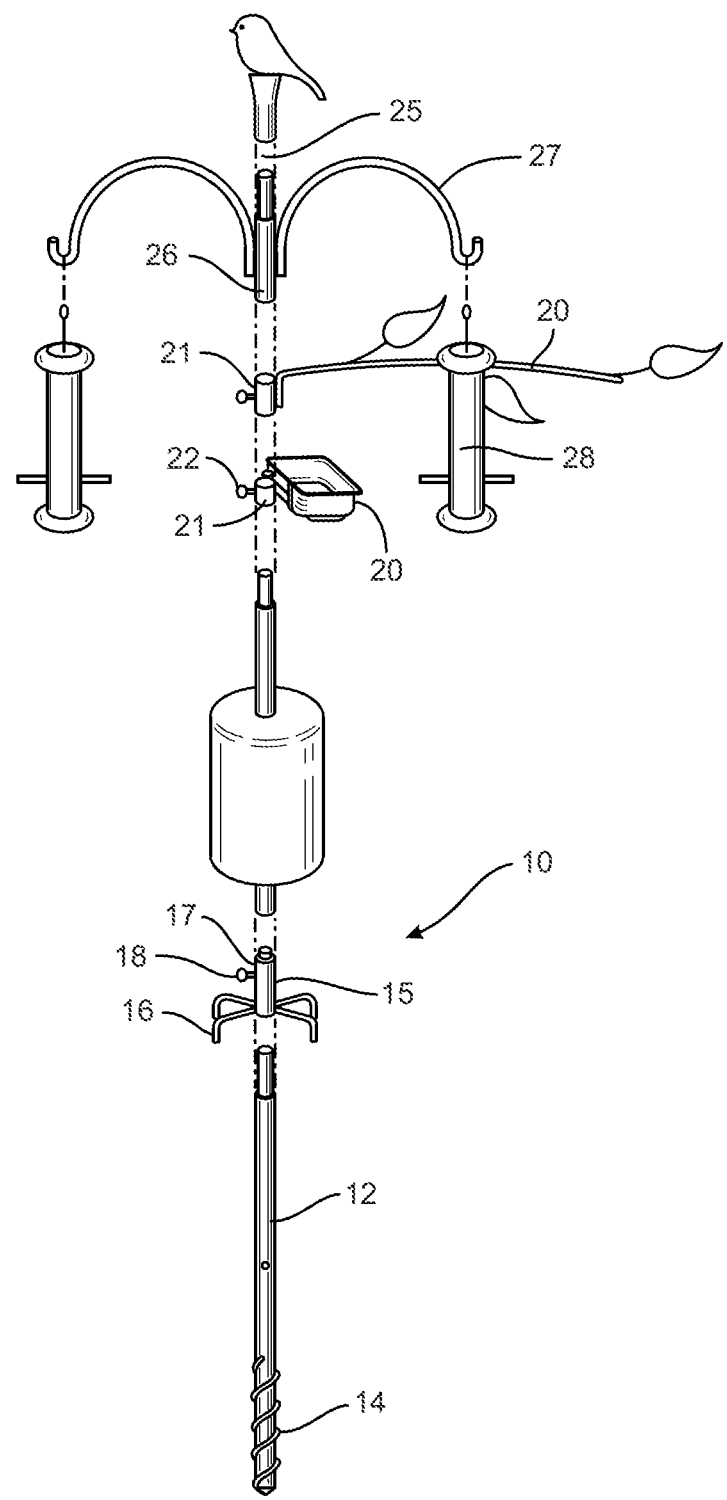
FIG. 1 is a perspective view of a mounting pole assembly of the prior art.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

Figure 2:
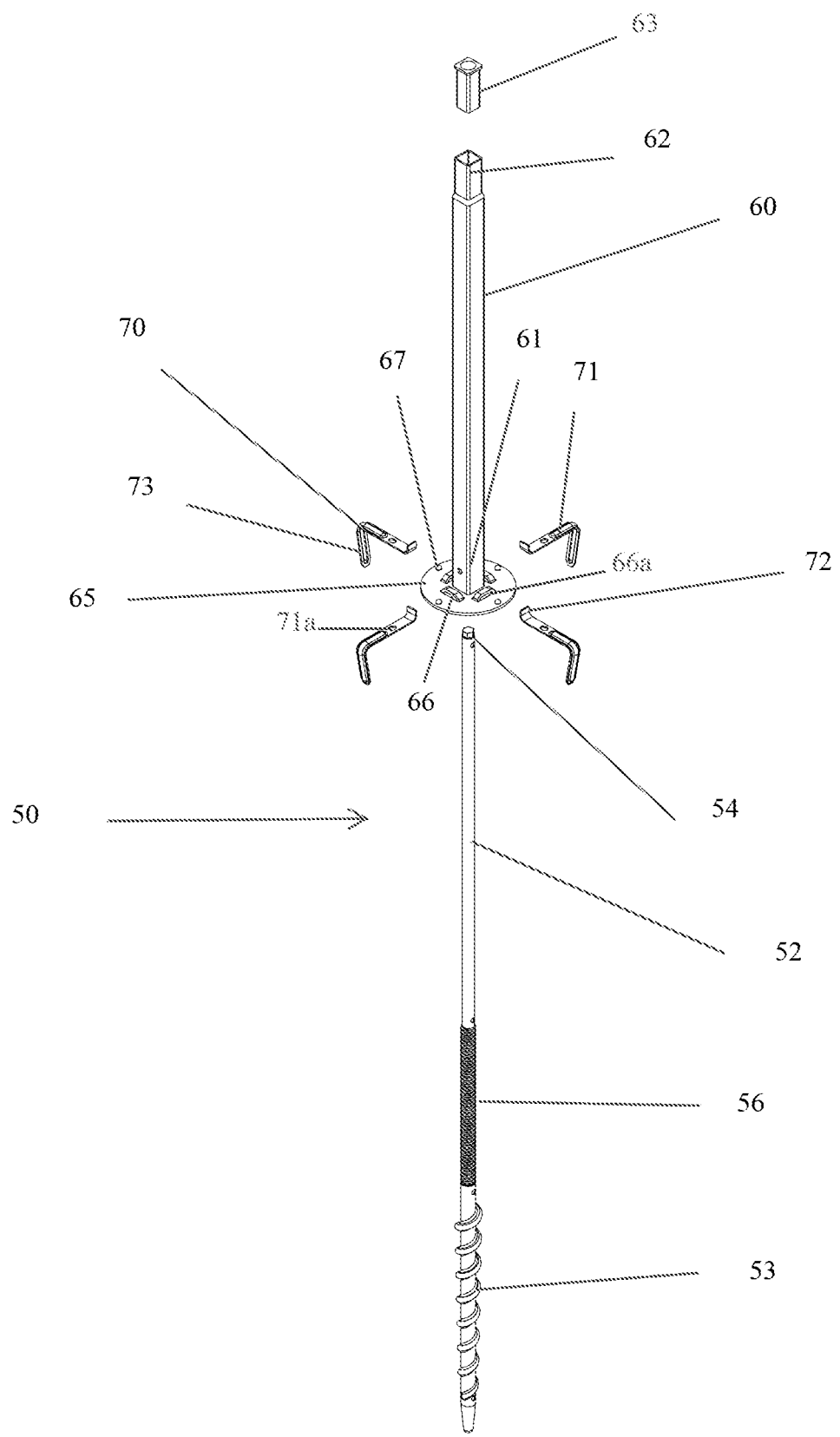
FIG. 2 is an exploded view of the components of a mounting pole assembly according to the present disclosure.

According to one embodiment of the present disclosure, a pole assembly 50 includes a pole 52 that terminates at one end in an auger end 53, as shown in FIG. 2. The auger end is configured to be initially pushed into the ground and then advanced into the ground by rotating the auger end in the clockwise direction in the illustrated embodiment. The upper end 54 of the pole 52 is configured to engage a driving tool, such as the tool 80 shown in FIG. 3A. The tool 80 can include a hex socket 81 with the upper end 54 having a complementary hex configuration to be received within the socket. The tool 80 includes a male end 82 that can be configured to engage the socket of a power drill. The tool 80 can thus be used to drive the auger end 53 into the ground. The upper end 54 can also be engaged by a manual tool, such as a wrench, to manually rotate the auger end. The pole 52 includes machine threads 56, such as Acme threads, adjacent the auger end 53 that are configured to receive the upper tube assembly 60 as described in more detail herein.

In one embodiment, the upper tube assembly 60 includes a square tube 61 that is sized to fit over the pole 52 when the auger end 53 is fully engaged in the ground, as shown in FIG. 3B. However, the square tube 61 has a length less than the length of the pole from the upper end of the auger end 53 to the upper end 54 of the pole so that a portion of the pole 52 is accessible above the end of the square tube. The square tube 61 has a swaged end 62 that is configured to receive an extension tube, such as tube 90 shown in FIG. 3D. A bushing 63 is configured to fit over the swaged end 62 of the tube assembly 60. The bushing has an opening sized for a close running fit with the pole 52 to center the pole within the square tube assembly 60.

The opposite end of the square tube 61 includes a stabilizer disk 65 affixed to the tube. The stabilizer disk 65 can define internal threads (not shown) to mate with the threads 56 of the pole 52. The threaded interface between the disk and pole can include counter-clockwise threads relative to the clockwise direction of the thread in the auger end 53. The tube assembly 60 can be mounted onto the pole 52 by threading the disk 65 onto the threads 56. Subsequent rotation of the pole 52 by the tool 80 won't unseat the square tube 60 from the pole since the thread directions are the same.

The stabilizer disk 65 is configured to contact the ground when the auger end 53 is fully engaged within the ground, as shown in FIG. 3B, and the square tube 61 is threaded down onto the threads 56. The stabilizer disk 65 defines a plurality of upraised flanges 66 that form open slots 66a facing the square tube 61, as shown in FIG. 2. Each slot 66a is configured to receive a corresponding stake 70, and in particular an upturned end 72 of the stake. The stake 70 includes a radial leg 71 from which the upturned end 72 extends and from which a downturned leg 73 extends. The upturned end 72 of the stake is configured to be introduced into the slot 66a and to allow the leg to be pivoted downward toward the disk 65 until the upturned end 72 is in contact with or immediately adjacent the square tube, as shown in FIG. 3A. In this position, the radial leg 71 rests on the top surface of the disk 65. The disk 65 can include an upward-facing dimple 67 arranged to engage a hole 71a in the radial leg 71 of the leg to help prevent the stake from being dislodged from the upraised flange 66.

The downturned leg 73 of the stake 70 is oriented at an acute angle relative to the radial leg 71, as seen in FIG. 3C. The angle of the leg 73 is calibrated to match the direction of pivoting of the leg when the upturned end 72 is engaged within the flange 66. As a result, when the disk 65 is in contact with the ground, as shown in FIG. 3C, the stakes 70 can be added to the assembly 50 with the downturned legs 73 aligned to be pushed into the ground as the leg is pivoted. In one specific embodiment, the acute angle between the radial leg 71 and the downturned leg 73 is about 80°. Four legs spaced at 90° intervals are provided for stability in all directions.

The installation of the assembly 50 is depicted in FIGS. 3A-3D. The tube assembly 60 is placed over the pole 52 and is at least partially threaded onto the threads 56 so that the upper end 54 of the pole is accessible for engagement with the driving tool 80. Although the stakes 70 are shown mounted on the disk 65 in FIGS. 3A-3B, the stakes are preferably not installed until the disk 65 is properly seated on the ground, as shown in FIGS. 3C-3D. The pole can be rotated to drive the auger end 53 into the ground until the auger end is completely threaded into the ground, such as by using the tool 80 and power drill as described above. A tool 85 is provided that is configured to rotate the tube assembly 60 to advance the tube assembly down the machine threads 56 of the pole 52. As shown in FIG. 3E, the tool 85 includes a "tuning fork" portion 86 that is configured to be placed around the square tube 61. The tool 85 can be manually turned, by grasping the extension 87, to thread the threaded disk 65 down the threads 56 of the pole, as depicted in FIG. 3A. In another approach, with the tuning fork 86 still engaged to the tube 61, an extension tube 90 can be passed through a collar 88 sized to receive the extension tube. The extension tube 90 can now serve as a lever arm to facilitate rotation of the tube assembly 60 onto the pole. It is understood that the auger end 53 can be at least initially driven into the ground manually, but that as the auger end drills deeper into the ground it becomes more difficult to rotate the auger end. The tool 85 can be used to help drive the auger into the ground. In this aspect, the outer tube 61 is rotationally fixed to the inner pole 52. In one embodiment, the different direction of the threaded interface 156 and the auger thread 53 allows the outer tube to be rotated in the clockwise direction of the auger thread without rotating the threaded interface. Alternatively, the outer tube can be fastened to the inner post by a set screw (not shown) advanced into the screw hole 60a. In either case, with the tube and pole fixed to rotate together, the extension tube 90 adds a long lever arm to the tool 85, providing a significant mechanical advantage to drive the auger end 53 to its full depth in the ground.

As shown in FIG. 3B, the square tube 60 need not be fully advanced onto the machine threads of the pole 52 as the auger 53 is driven into the ground. Once the auger is at a suitable depth, the outer tube 60 can be advanced along the threads 56 until the disk 65 contacts the ground. It is noted that the stakes 70 are not engaged to the disk 65 at this time. The tuning fork 86 can be used to rotate the square tube 60, and is particularly beneficial to rotate the tube one or two full rotations so that the bottom face of the disk 65 is slightly embedded within the ground. This step can help level the pole assembly as well as tighten the auger end by compressing the disk into the ground. The stakes 70 can then be introduced into the disk 65 as described above, with the downturned legs 73 being driven into the ground as the stakes are pivoted on the disk.

It is contemplated that the pole 52 and auger end 53 can be driven into the ground with or without the tube assembly 60 in position on the pole. Thus, in one approach, the auger end 53 can be driven into the ground using the tool 80 with a power drill until the machine threads 56 are at the surface of the ground. The tube 61 can then be threaded onto the machine threads 56 either manually or using the tool 85 and tuning fork 86.

In another aspect, rather than using the tool 80 to drive the auger end 53 into the ground, the tool 85 can be provided with a socket 87, similar to the socket 81, which is configured to engage the upper end 54 of the pole 52. The tool 85 can then be used to drive the auger end 53 into the ground—manually at first, if desired, and then using the extension tube 90 as a lever arm engaged within the collar 88. The tool 85 is thus a multi-use tool capable of driving the auger end 53 into the ground, either by engaging the end 54 of the pole 52 with the socket 87 or by engaging the outer surface of the tube 61 with the tuning fork 86. The tool 85 also provides the user with a significant lever arm and mechanical advantage, via the engagement of the extension tube 90 with the collar 88, to drive the auger end to its full depth within the ground.

The installed configuration of the pole assembly 50 is shown in FIG. 3C. The grommet 63 can be mounted within the swaged end 62 of the square tube to align the pole 52 within the tube. An extension tube 90 can then be mounted over the swaged end 62. A set screw or other fastener (not shown) can be advanced through a screw hole 90a to hold the extension tube 90 on the swaged end 62 of the tube assembly 60.

Figure 5:
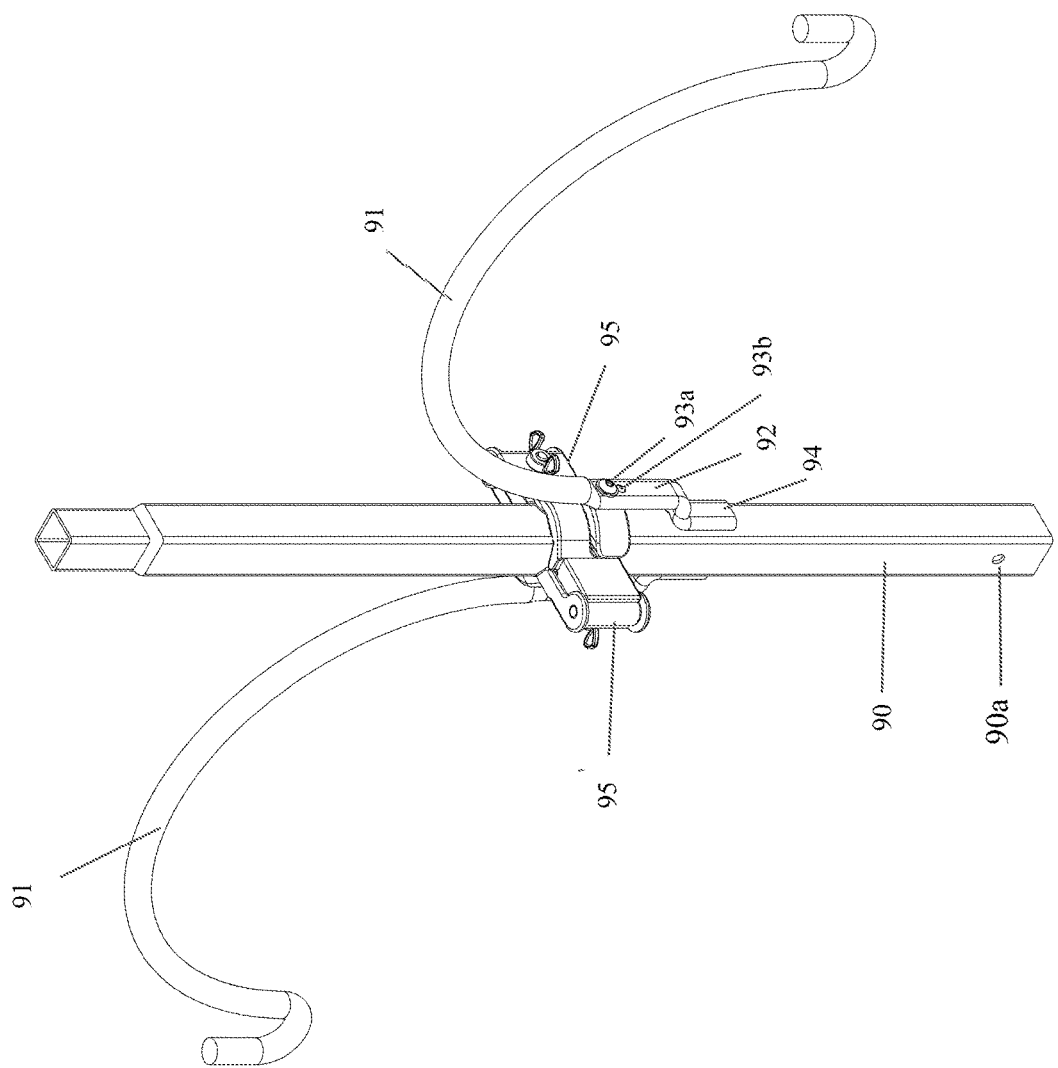
FIG. 5 is an enlarged perspective view of an accessory mounted to the pole assembly of FIG. 2 using the clamps of FIGS. 4A-B.

As shown in FIG. 5, the extension supports bird feeder arms 91 using the clamps 95 shown in FIGS. 4A, 4B. As can be appreciated from FIG. 5, the two arms 91 are arranged at the same height on the extension 90, akin to the bird feeder arms 27 of the prior art assembly 10. However, unlike the prior art assembly, the bird feeder arms 91 are separate from each other and from the clamps 95. This allows for much more compact packaging of the complete assembly 50. The same is true for the stabilization stakes 70 which are provided separate from the stabilization disk 65. The assembly 50 of the present disclosure can fit into packaging with a maximum lateral dimension slightly greater than the dimension of the curved bird feeder arms 91 and a maximum length slightly greater than the length of the pole 52.

With reference to FIGS. 4A, 4B, the clamp 95 includes an upper jaw 96 and a lower jaw 97 that are pivotably connected at a pivot 98. The pivot can be a press-fit pin extending through overlapping portions 96a, 97a of the two jaws. Alternatively, a rivet can each adjacent pair of portions 96a, 97a to each other at opposite vertical sides of the clamp. The two jaws are arranged so that they do not overlap each other laterally relative to a vertical axis through the pivot 98. In other words, the bottom surface 96a of upper jaw 96 is generally coplanar with the top surface 97a of the lower jaw 97. This allows two clamps to be placed in the overlapping arrangement shown in FIG. 5, with the upper jaw 96 of one clamp facing the lower jaw 97 of the second clamp 95', with the second clamp "flipped over" relative to the first clamp. Likewise, the lower jaw 97 of the first clamp 95 faces the upper jaw 96 of the second clamp 95'. This feature of the clamp allows two clamps to be mounted on the square tube parallel to each other and with the mounting feature (described below) of the two clamps 180° opposite each other A locking assembly 99 is provided that includes a screw 99a that extends through aligned slots 100 in each jaw and a wing nut 99b for threaded engagement with the screw. When the wing nut is fastened to the screw, the clamp jaws cannot be opened, as shown in FIG. 4A. When the screw 99a and wing nut 99b are removed, as shown in FIG. 4B, the jaws 96, 97 of the clamp can be moved apart. When the clamp is positioned on the extension tube 90, or the square tube 60, the jaws are closed around the tube and the locking screw 99 tightened to lock the clamp at the pivot 98. It is contemplated that the locking screw can be spring biased to push the jaws apart. The locking screw can also be fixed to the clamp so that it cannot be removed; only loosened to allow the clamp to open.

As shown in FIG. 4A, B, the lower jaw 97 of the clamp includes a mounting face 102 that define a mounting feature including a threaded bore 103 and a projection 104. As shown in FIG. 5, the bird feeder arm 91 includes a mounting bracket 92 that defines a locking screw 93a and an opening 93b to receive the projection 104. The locking screw 93a is threaded into the bore 103 to lock the arm 91 to the clamp. The bird feeder arm 91 includes a lower flange 94 that rests against the extension tube 90 (or square tube 60) when the clamp is engaged to the tube. It can be appreciated that the bird feeder arm 91, or other accessory with a similar flange construction, can be attached to the clamp 95 prior to or after engaging the clamp on the tube. As noted above, the clamp is configured so that two clamps can be mounted on the square pole immediately adjacent each other with the mounting faces 102 of the clamps 180° opposite each other to support two accessories, such as two bird feeder arms 91, on opposite sides of the pole assembly.

The upper and lower jaws 96, 97 include a central face 112 flanked by faces 110, 111 that define corners 113, 114. The central face 112 is sized to the width of the extension tube so that the central face can be clamped flush against the surface of the square tube 90 or 60. Alternatively, the clamp can be rotated 45° so that the corners 113, 114 engage the corners of the square tube 90 or 60. This feature allows the clamp, and any associated accessory mounted to the clamp, to be supported at eight orientations around the square tube, rather than simply four. Thus, the clamp 95 can emulate the cylindrical collar 21 of the prior art assembly 10 that allows a 360° range of positions, while retaining the feature of a square tube that prevents the clamp and accessory from rotating relative to the tube. The inside of the jaws 96, 97 can include a rubber pad 116 to enhance the grip of the clamp on the tube 90, 60.

The components of the pole assembly 50 can be formed of a variety of materials capable of withstanding the elements. For instance, at least the auger end 53 of the pole 52 and the stakes 70 can be formed of powder coated steel to resist corrosion while embedded in the ground. The square tube 60 of can be formed of brushed stainless steel for aesthetic purposes and for resistance to rain and sun. The clamps 95 can be formed of die cast aluminum or of a rigid plastic.

Figure 6:
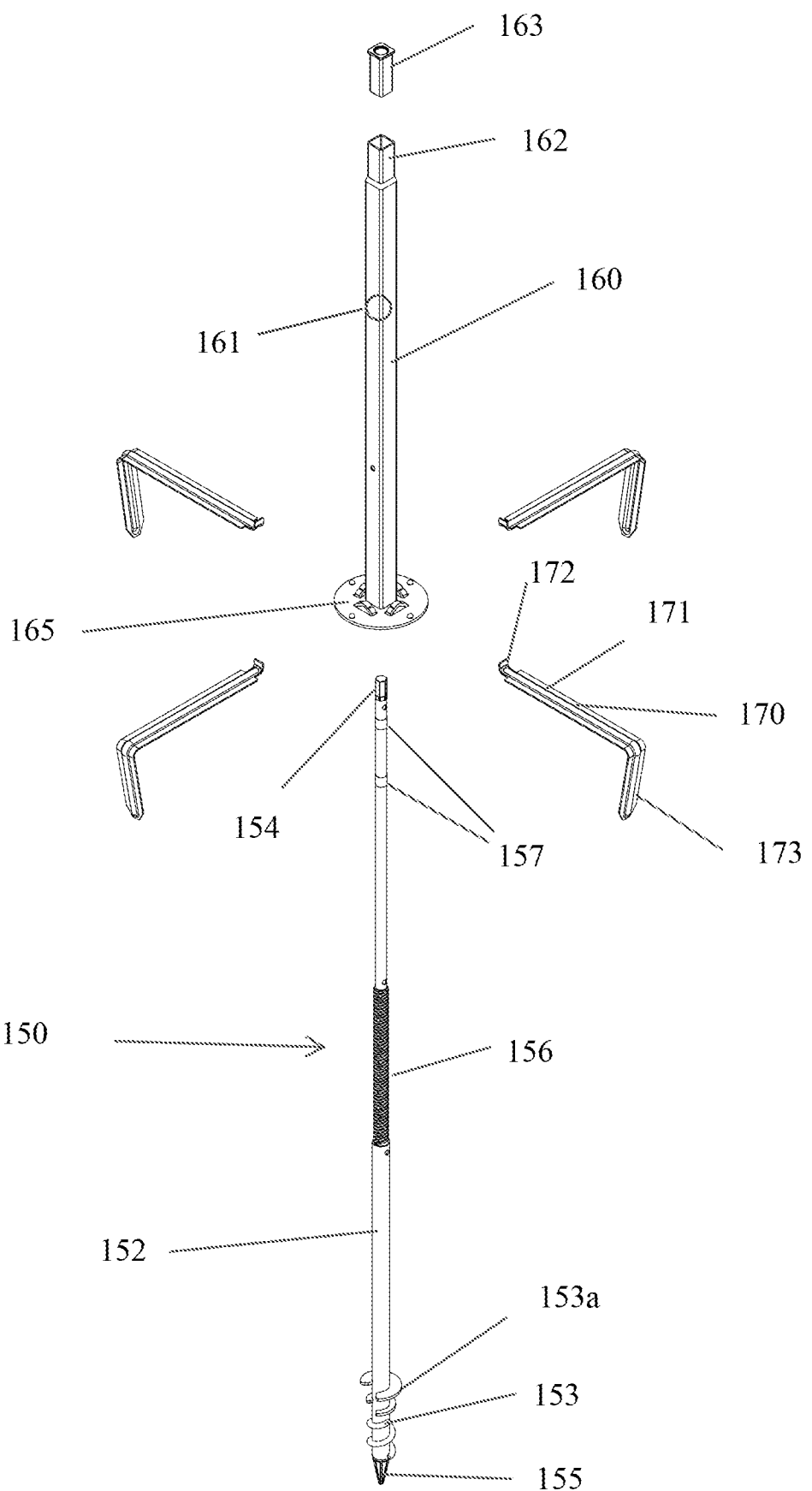
FIG. 6 is an exploded view of the components of a mounting pole assembly according to another embodiment of the present disclosure.

The pole 52 can be provided in a variety of lengths, with a preferred above-ground height of 24 inches. The auger end 53 can have a length of 8-10 inches to provide sufficient purchase in the ground to keep the pole assembly in a vertical orientation. The tube 60 can have a length of 16-20 inches and be 2×2 inch square. The disk can have a diameter of 4 inches. Of course, other dimensions are possible, although care must be taken that the height of a fully loaded assembly is not so high in relation to the depth of the auger end in the ground as to render the assembly unstable. In addition, other configurations of the tube 60 and extension tube 90 are contemplated, including circular. The radial leg 71 of the stakes can have a length of 3 inches and the downturned leg 73 can have a length of 2-2½ inches to be embedded into the ground. For added stability, the stakes can have a radial leg length of up to 9 inches and a downturned leg length of up to 6 inches, provided that the stake retains the ability to be engaged to the disk 65 while the stakes are embedded into the ground, as described above A pole assembly 150 is modified from the pole assembly 50, as shown in FIG. 6. The pole assembly 150 includes a pole 52 with an auger end 153 at one end, an upper end 154 configured to receive the driving tool, such as tool 80 described above, and intermediate machine threads 156. The pole 152 is similar to the pole 52 with some modifications. In particular, the auger end 153 is shorter than the auger end 53 which can make driving the auger end into the ground easier for the user. Thus, in this embodiment, the auger end 153 has a length of 3-4 inches. The thread of the auger end can be tapered so that the uppermost segment 153a of the thread is larger to help stabilize the pole within the ground. The pole 152 can still be driven into the ground the same depth as the pole 52, but having a shorter auger end 153 reduces the resistance as the auger end is threaded into the ground. In another modification, the auger end 153 includes a tip 155 that is formed of plastic rather than as a welded tip to the auger. The tip 155 can be press-fit or snap-fit into the auger end 153 in a known manner.

The upper end 154 of the pole is longer than the end 54 of the prior embodiment, which can make it easier for the user to engage the driving tool 80 to the hex feature of the end 154. In another modification, the machine threads 156 are disposed further up the pole 512 from the auger end 153 than the machine threads 56 of the pole 52. This increased height moves the machine threads 156 farther from the ground when the pole assembly 150 is installed, thereby more effectively hiding the machine threads from the elements. For a pole with a 24 inch above-ground height, the threads can be centered at the halfway position on the pole. The threads 156 are configured to engage internal threads 161 defined in the outer tube 161. However, since the machine threads 156 are at a greater height on the pole 152, the internal threads of the tube 161 are positioned farther up the interior of the tube so that the stabilizer disc 165 can contact the ground when the pole assembly 150 is installed. In this embodiment, the internal threads 161 can be 10-12 inches from the disc 165 for a 16-20 inch tube 160.

The pole assembly 150 includes an outer tube 160 with a swaged end 162 to receive a bushing 163, similar to the outer tube 60. The tube 160 also includes a flange 165 at the lower end configured like the flange 65 of the prior embodiment. The outer tube 160 can be square like the tube 60 and can be installed in the same manner. The flange 165 is configured to receive a plurality of stakes 170 in the same manner described above. The stakes 170 are generally configured like the stakes 70, including the radial leg 171, upturned end 172 and downturned leg 173. However, in one modification, the radial leg 171 of the stakes 170 is longer than the radial leg 71 of the stakes 70. In one specific embodiment, the radial leg has a length of 5-6 inches. The longer stakes increase the stability of the pole assembly 150 when it is mounted in the ground since the anchor is radially wider than the anchor of the pole assembly 50. The extra radial length also allows the user better access to push the downturned legs 173 into the ground with his/her foot.

In another modification, the pole 152 can include a pair of knurled portions 157 spaced apart relative to each other and relative to the end 154 of the pole. The knurled portions provide a visual indicator to the user as to whether the pole 152, and auger end tip 153, needs to be threaded further into or further out of the ground. The knurled portions can constitute other surface treatments of the pole 152 that can be readily distinguished over the un-treated portion of the pole. The portions 157 can constitute strips affixed or adhered to the pole at the two locations, although the strips are susceptible to wear when exposed to the elements. A surface feature defined in the pole is less likely to wear and is therefore more likely to remain visible to the user throughout the life of the pole assembly 150. In use, the outer tube 165 can be threaded to the end of the threads 156 of the pole, at which point the outer tube is effectively fixed to the pole. The hex end 154 can be engaged with a driving tool to thread the auger 153 into the ground until the disk 165 contacts the ground. Once the disk contacts the ground, the pole can be rotated further relative to the outer tube 165 (since the outer tube is held against further rotation by the disk) until the lower portion 157 is hidden within the tube. The pole is properly embedded within the ground when the upper end 162 of the tube is between the two knurled portions. Once the pole 152 is properly positioned, the outer tube can be rotated relative to the pole (since the pole is held against further rotation by the auger) to embed the disk into the ground.

Figures 7A, 7B:
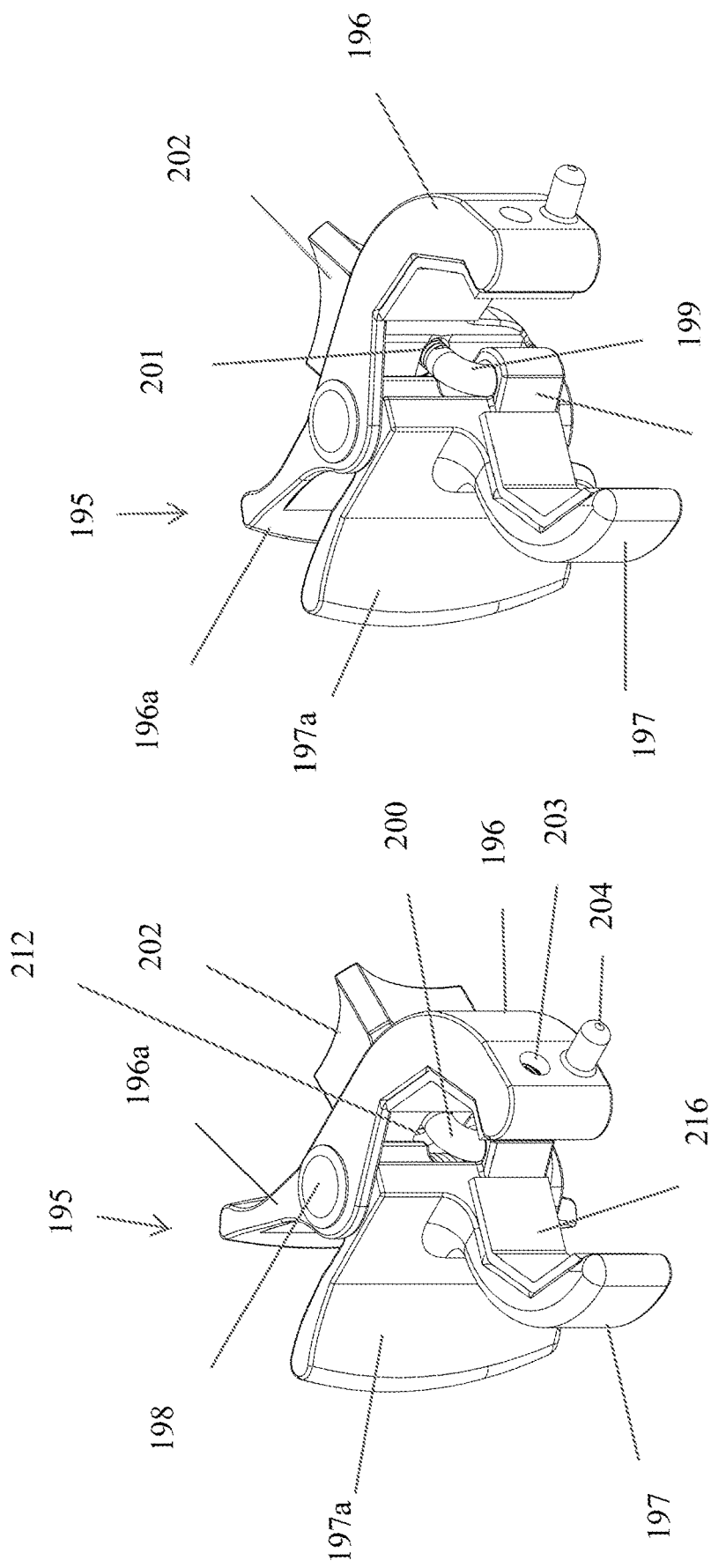
FIGS. 7A and 7B are perspective views of another embodiment of a clamp for use with the pole assembly of FIGS. 2 and 6, with the clamp shown in its closed and opened configurations.

A modified clamp 195, shown in FIGS. 7A-7B, is provided that functions in the same manner as the clamp 95 to facilitate mounting an accessory, such as the bird feeder arms 91, in the manner shown in FIG. 5. Thus, the clamp 195 includes an upper jaw 196 and a lower jaw 197 that are configured to allow two clamps to be mounted on the upper tube 61/161 directly adjacent each other, as described above. Thus, the two jaws are configured to engage the square tube 61/161 in the manner described above. The jaws include the bore 203 and projection 204, that are the same as the bore and projection 103, 104 for the clamp 95 that allow the accessory to be mounted on the clamp. The two jaws are pivotably connected at a pivot 198, which can be configured like the pivot 98 described above. However, in one modification, each jaw includes a lever portion 196a, 197a, respectively, that can be manipulated by the user to move the jaws apart, as seen by comparing the position of the jaws and levers in FIGS. 7A and 7B. The jaws each include compressible pads 216 on the inner faces of the jaws to enhance the grip of the clamp on the tube 61/161.

In another modification of the clamp 195 relative to the clamp 95, a locking assembly 199 is captured within the clamp, in lieu of the separate screw 99a and wing nut 99b of the clamp 95. In this embodiment, the screw 200 is embedded within a boss 211 at the interior of the lower jaw 197, as shown in FIG. 7A. The screw is curved to pass through an opening 212 in the upper jaw 196 with the threaded end 201 of the screw 200 accessible for engagement with internal threads (not shown) of a knob 202. The knob 202 can be held onto the threaded end 201 of the screw by a snap ring (not shown) or other suitable component that allows the knob to be unthreaded along the screw without being removed. As shown in FIG. 7A, when the clamp jaws are closed the screw 200 extends through the opening 201 and the knob 202 can be tightly threaded onto the upper jaw 196 to hold the jaws in position. Alternatively, as shown in FIG. 7B, the knob can be unthreaded from the screw so that the upper jaw can be moved outward relative to the lower jaw, leaving an opening between the jaws wide enough for the clamp 195 o be removed form or mounted on the tube 161. Since the knob is still captured on the screw, there are no loose components for the clamp 195.

In the present disclosure, the pole assemblies 50 and 150 have been described for use in supporting bird accessories. However, the pole assemblies can be adapted to act as a vertical support for other accessories and applications. For example, in one embodiment, the auger ends 53, 153 can be modified to be threaded into a patio deck. In that instance, the disk 65/165 is used to compress the deck material, particularly wood, to effectively clamp the modified auger end into the deck. It is further contemplated that the clamps 95/195 can be used to engage other accessories or components to the pole assemblies 50/150 or other pole or vertical stands. The inner face of the clamp arms 96, 97 (196, 197) can be modified according to the outer geometry of the pole or stand being engaged by the clamp.

The present disclosure should be considered as illustrative and not restrictive in character. It is understood that only certain embodiments have been presented and that all changes, modifications and further applications that come within the spirit of the disclosure are desired to be protected.

What is claimed is:

1. A pole system for supporting birding accessories, such as bird feeders, perches or bird houses, the pole system comprising:
   an elongated hollow outer tube;
   an elongated post having an auger at one end configured to be driven into the ground and an opposite end configured to engage a tool for rotating the post when said auger is driven into the ground, said elongated post sized to be received through the outer tube and having a length greater than the length of said elongated outer tube so that said opposite end of said post can be engaged outside said outer tube when said auger is driven into the ground;
   a disk attached to a bottom end of said outer tube, said disk defining an opening for passage of said post therethrough, said disk having a bottom surface configured to engage the ground and including a plurality of flanges on an upper surface opposite said bottom surface, each of said flanges defining an opening between the flange and the upper surface of the disk; and
   a plurality of stakes corresponding to said plurality of flanges, said stakes including an elongated leg, one end of said leg being upturned and configured to be engaged within said opening of a corresponding one of said plurality of flanges, and an opposite end of said elongated leg being downturned relative to said upturned end, said downturned opposite end configured to penetrate the ground, wherein the upturned leg of each of said plurality of stakes is removably received by a corresponding one of said plurality of flanges with said elongated leg extending radially outward from said disk.

2. The pole system of claim 1, further comprising a threaded engagement between said outer tube and said elongated post.

3. The pole system of claim 2, wherein the threaded engagement includes machine threads defined on said elongated post and internal threads on one of said disk and said outer tube.

4. The pole system of claim 3, wherein said auger includes an auger thread, said auger thread threaded in a direction opposite to the direction of said machine threads.

5. The pole system of claim 1, wherein said elongated leg of each of said plurality of stakes has a length of three (3) to nine (9) inches.

6. The pole system of claim 1, wherein said downturned leg of each of said plurality of stakes has a length of two (2) to four (4) inches.

7. The pole system of claim 1, wherein said outer tube has a length of 16-20 inches and said post has a length of at least 24 inches.

8. The pole system of claim 1, wherein said auger has a length of eight (8) to ten (10) inches.

9. The pole system of claim 1, wherein said auger has a length of three (3) to four (4) inches.

10. The pole system of claim 1, wherein said outer tube has a swaged portion at a top end of said outer tube, said swaged portion configured to receive another outer tube mounted thereon.

11. A pole system for supporting birding accessories, such as bird feeders, perches or bird houses, the pole system comprising:
    an elongated hollow outer tube;
    an elongated post having an auger at one end configured to be driven into the ground and an opposite end configured to engage a tool for rotating the post, said elongated post sized to be received through the outer tube and having a length greater than the length of said elongated outer tube so that said opposite end of said post can be engaged outside said outer tube when said auger is driven into the ground;
    a disk attached to a bottom end of said outer tube, said disk defining an opening for passage of said post therethrough, said disk having a bottom surface configured to engage the ground and including a plurality of flanges on an upper surface opposite said bottom surface, each of said flanges defining an opening; and
    a plurality of stakes corresponding to said plurality of flanges, said stakes including an elongated leg, one end of said leg being upturned and configured to be engaged within said opening of a corresponding one of said plurality of flanges, and an opposite end of said elongated leg being downturned relative to said upturned end, said downturned opposite end configured to penetrate the ground, wherein the upturned leg of each of said plurality of stakes is removably received by a corresponding one of said plurality of flanges with said elongated leg extending radially outward from said disk;
    wherein said disk includes a dimple radially offset from each of said plurality of flanges; and
    wherein each of said plurality of stakes includes an opening configured and arranged to receive said dimple when the upturned leg of each of said plurality of stakes is received in the corresponding one of said plurality of flanges.

12. A pole system for supporting birding accessories, such as bird feeders, perches or bird houses, the pole system comprising:
    an elongated hollow outer tube;
    an elongated post having an auger at one end configured to be driven into the ground and an opposite end configured to engage a tool for rotating the post, said elongated post sized to be received through the outer tube and having a length greater than the length of said elongated outer tube so that said opposite end of said post can be engaged outside said outer tube when said auger is driven into the ground;

a disk attached to a bottom end of said outer tube, said disk defining an opening for passage of said post therethrough, said disk having a bottom surface configured to engage the ground and including a plurality of flanges on an upper surface opposite said bottom surface, each of said flanges defining an opening;

a plurality of stakes corresponding to said plurality of flanges, said stakes including an elongated leg, one end of said leg being upturned and configured to be engaged within said opening of a corresponding one of said plurality of flanges, and an opposite end of said elongated leg being downturned relative to said upturned end, said downturned opposite end configured to penetrate the ground, wherein the upturned leg of each of said plurality of stakes is removably received by a corresponding one of said plurality of flanges with said elongated leg extending radially outward from said disk;

a clamp including opposite jaws pivotably connected to each other and configured to releasably engage an outer surface of said outer tube, at least one of said opposite jaws including a mounting feature for mating with and supporting a birding accessory on said pole system, wherein said opposite jaws include an upper jaw and a lower jaw, said upper jaw and lower jaws vertically offset relative to each other when the clamp is engaged to said outer tube, whereby a second clamp can be engaged to the outer tube with the upper jaw of said second clamp contacting the lower jaw of said clamp and the lower jaw of said second clamp contacting the upper jaw of said clamp.

13. The pole system of claim 12, wherein said clamp includes a locking assembly for locking said opposite jaws against pivoting relative to each other.

14. The pole system of claim 13, wherein said locking assembly includes:
a screw embedded within one of said jaws and extending through a slot in the other of said jaws; and
a manually engageable knob threadedly engaging said screw.

15. The pole system of claim 12, wherein each of said opposite jaws includes a lever portion that is manually engageable to pivot said opposite jaws apart relative to each other.

16. A pole system for supporting birding accessories, such as bird feeders, perches or bird houses, the pole system comprising:
an elongated hollow outer tube;
an elongated post having an auger at one end configured to be driven into the ground and an opposite end configured to engage a tool for rotating the post, said elongated post sized to be received through the outer tube and having a length greater than the length of said elongated outer tube so that said opposite end of said post can be engaged outside said outer tube when said auger is driven into the ground;
a disk attached to a bottom end of said outer tube, said disk defining an opening for passage of said post therethrough, said disk having a bottom surface configured to engage the ground and including a plurality of flanges on an upper surface opposite said bottom surface, each of said flanges defining an opening; and
a plurality of stakes corresponding to said plurality of flanges, said stakes including an elongated leg, one end of said leg being upturned and configured to be engaged within said opening of a corresponding one of said plurality of flanges, and an opposite end of said elongated leg being downturned relative to said upturned end, said downturned opposite end configured to penetrate the ground, wherein the upturned leg of each of said plurality of stakes is removably received by a corresponding one of said plurality of flanges with said elongated leg extending radially outward from said disk; and
a tool including:
a tuning fork portion configured to receive and engage the outer surface of said outer tube; and
a collar integral with said tuning fork portion configured to receive a second outer tube therethrough, whereby said second outer tube can act as a lever arm for rotating said outer tube with said tuning fork portion of said tool.

17. The pole system of claim 16, wherein said tool includes an integral extension configured to engage the opposite end of said elongated post to act as a driving tool for rotating said auger at said one end of said elongated post.

* * * * *